Figure 10:
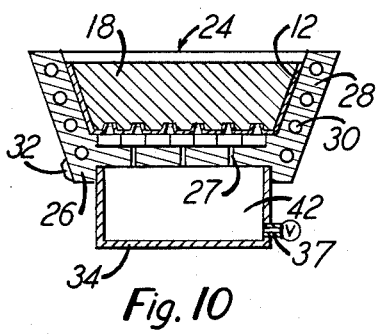

April 2, 1963 T. A. WEISZ 3,083,880
ADHESIVE PACKAGE
Filed June 9, 1958 2 Sheets-Sheet 1
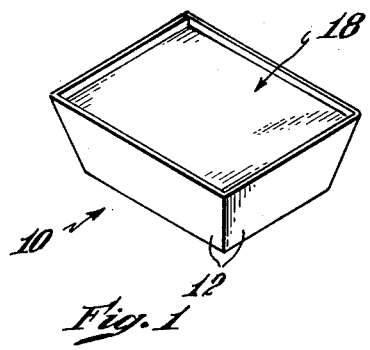
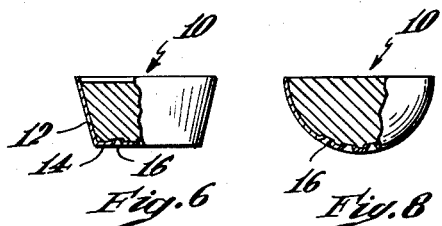
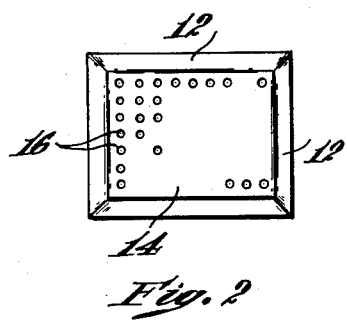
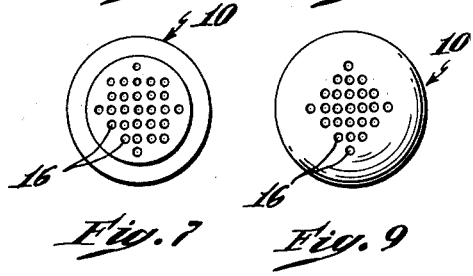
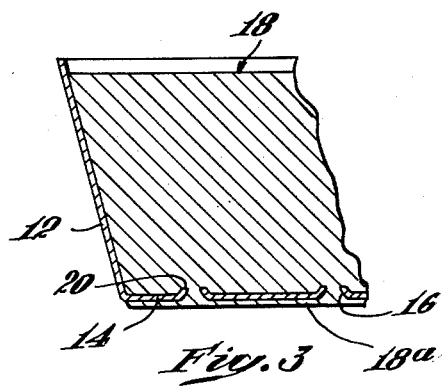
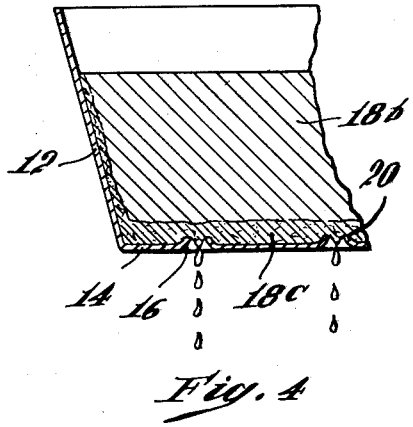
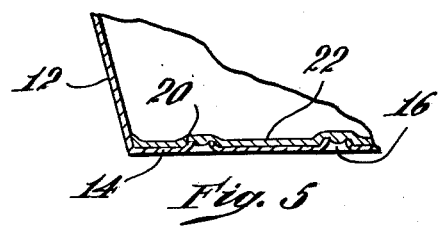
Inventor
Thomas A. Weisz
by Roberts, Cushman & Grover
Attys April 2, 1963 T. A. WEISZ 3,083,880
ADHESIVE PACKAGE
Filed June 9, 1958 2 Sheets-Sheet 2

INVENTOR.
Thomas A. Weisz
BY
Roberts, Cushman & Grover
ATT'YS

United States Patent Office 3,083,880
Patented Apr. 2, 1963

3,083,880
ADHESIVE PACKAGE
Thomas A. Weisz, Plymouth, Mass., assignor, by mesne assignments, to International Shoe Machine Corporation, Brighton, Mass., a corporation of Massachusetts
Filed June 9, 1958, Ser. No. 740,901
6 Claims. (Cl. 222—146)

This invention relates to a package of adhesive as an article of manufacture and more especially to thermoplastic adhesive packaged in solid form for use in shoe manufacturing processes.

While a true thermoplastic adhesive will melt with very little, if any, oxidation, most such adhesives must be modified with additives to improve their characteristics in certain respects according to their use. The modified adhesive is however subject to oxidation; consequently, as the adhesive is melted an oxide scum is formed which becomes thicker the longer the adhesive is kept melted and with each melting. If the adhesive is to be applied by means of applicator rolls or through a nozzle this oxide scum quickly impairs their operation, so that they have to be cleaned and this results in loss of a substantial amount of adhesive and of valuable time.

The principal objects of the invention are to provide a package of adhesive so designed that it is possible to melt only as much adhesive as may be needed at any given time without removing it from the package and without exposing the melted adhesive or the remaining unmelted adhesive to oxidation and from which the adhesive may be completely drained as it is used up, leaving behind however any oxide film or residue which is formed, so that it cannot interfere with the applying means. Other objects are to provide for melting the adhesive within the package from its lower side gradually as it is needed without melting the entire body of adhesive, of maintaining the solid adhesive above the melted adhesive so as to constitute a stopper to exclude air from the lower side and of providing means for trapping the residue so that it cannot reach the applicator means.

As herein illustrated the package comprises a combination of a thin walled receptacle having a bottom part containing a plurality of small perforations and a solid body of adhesive substantially filling the receptacle, the adhesive having substantially no creep or cold flow at ambient temperatures. The receptacle is preferably thin sheet metal having little reclaim value so that it may be discarded when emptied and is geometrically shaped so as to decrease in cross-section from top to bottom. To assist in retaining the oxide scum the perforations at the bottom are produced by punching upwardly through the bottom to make an upstanding flange around each perforation.

Figure 11:
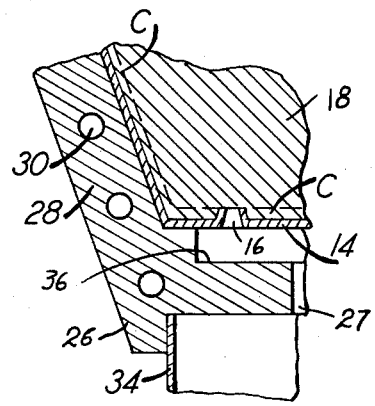
Figure 12:
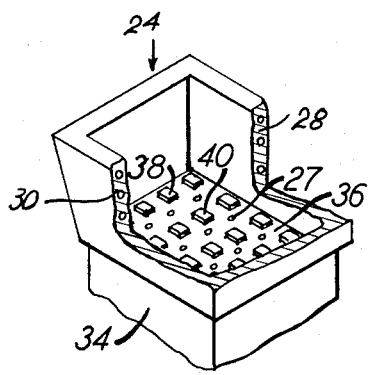

The invention will now be described in greater detail with reference to the accompanying drawings wherein:
FIG. 1 is a perspective view of the package;
FIG. 2 is a bottom view;
FIG. 3 is a fragmentary vertical section prior to melting of any of the adhesive.
FIG. 4 is a fragmentary vertical section showing the adhesive partly melted;
FIG. 5 is a fragmentary vertical section showing the adhesive completely drawn off leaving only the scum;
FIGS. 6 and 7 show an elevation partly in section and bottom views of an alternatively shaped package of frustoconical shape;
FIGS. 8 and 9 show an elevation partly in section and bottom views of an alternatively shaped package of hemispherical shape, and
FIG. 10 is a longitudinal vertical section through an adhesive melting pot for a package of the kind shown in FIGS. 1 through 5;

FIG. 11 is a vertical section of the pot to much larger scale; and
FIG. 12 is a perspective showing of the bottom structure of the pot.

As herein disclosed, the invention is concerned with the packaging of a thermoplastic adhesive especially suitable for the manufacture of shoes, the requirements of which are tenacity, toughness, quick-set and substantially no creep or cold flow at the temperatures and pressure ordinarily encountered, either during manufacture of the shoes or as long as the shoe is useful as such. Thus the adhesive must withstand such manufacturing operations as steaming, exposure to radiant heat, pounding, roughing and the reactive stresses of the upper material to lasting, as well as moisture, heat and repeated flexure during wear.

The versamid resins have proved to be especially suited to meet the foregoing requirements and the following compositions are examples:

*Example 1*

| | |
|---|---|
| Versamid 930 | 80%. |
| Versamid 100 | 20%. |
| Melting point | 105–115° C. |
| Viscosity | 150 poises at 129° C. |

*Example 2*

| | |
|---|---|
| Versamid 930 | 75%. |
| Pentalyn A | 20%. |
| Piccolastic A25 | 5%. |
| Melting point | 95–105° C. |
| Viscosity | 150 poises at 128° C. |

*Example 3*

| | |
|---|---|
| Versamid 930 | 37.5%. |
| Versamid 940 | 37.5%. |
| Pentalyn A | 20.0%. |
| Piccolastic A25 | 5.0%. |
| Melting point | 95–105° C. |
| Viscosity | 150 poises at 121° C. |

The resins making up the compositions referred to above are as follows:

| Resin | Source | Chemical Composition |
|---|---|---|
| (1) Versamid 930 | General Mills, Inc. | Polyamide of dimerized vegetable oil fatty acid and polyamine. |
| (2) Versamid 940 | do | Do. |
| (3) Versamid 100 | do | Do. |
| (4) Pentalyn A | Hercules Powder Co. | Pentaerythritol ester of wood rosin. |
| (5) Piccolastic A25 | Pennsylvania Industrial Chemical Corp. | Low molecular weight polymer of styrene or its homologues. |

Having defined the character of the adhesive the invention resides broadly in the combination of a solid body of adhesive of the character defined, disposed within a receptacle which has a bottom part in which there are a plurality of small perforations, through which the adhesive can flow when melted, but which are too small to permit passage or escape of any of the oxide scum formed during melting.

The receptacle 10 (FIG. 1) is of rectangular cross-section having downwardly converging walls 12 and a flat bottom 14, in which there are a plurality of small perforations 16. A solid cake or body of adhesive 18 is disposed in the receptacle and corresponds in shape thereto, being smallest in cross-section at its bottom and largest in cross-section at its top.

The receptacle is made of thin sheet metal, for example, aluminum foil in the order of $5/1000''$ thickness and its bottom is perforated by punching upwardly from the outer side, approximately 16 holes to the square inch, so that on the inside there is an upstanding flange 20 surrounding each perforation.

The package is made up by placing one or more of the receptacles on a heavy metal plate which is unheated, that is, at room temperature and then pouring the melted thermoplastic adhesive into the receptacle. Due to the narrow range between melted and solid states, as soon as the liquid adhesive fills the perforations at the bottom of the receptacle and strikes the cold plate beneath it, it solidifies so that no further flow takes place and the receptacle is filled bottom upwardly. So quickly does solidification take place that the adhesive does not flow beyond the boundary at the bottom and forms only a very thin uniformly thick layer 18a, at the bottom of the receptacle on the outside (FIG. 3). Because of the non-creep characteristic of the adhesive the receptacle can be stored for long periods of time at any temperature which would be encountered under manufacturing conditions and in fact piled one upon the other to any desired height for storage purposes without the slightest indication of extrusion or flow of the thermoplastic through the bottom openings and of loss by this reason.

When the adhesive is to be used the package is preferably heated from the bottom and the sides in such a manner as to melt the adhesive at the bottom and the sides but only at the surfaces, as indicated in FIG. 4, without heating the adhesive upwardly from the bottoms, or inwardly of the walls, and as a result adhesive flows from the underside through the perforations into a suitably closed receptacle, as shown for example in Patent No. 2,809,772 and application Serial No. 693,352, filed October 30, 1957 now Patent Number 2,868,420. Due to the downward taper of the walls of the receptacle and of the shape of the body of adhesive, as the bottom side and side walls are gradually melted the solid adhesive inwardly thereof settles downwardly within the receptacle, providing in effect a stopper 18b (FIG. 4), which prevents air from gaining access to the bottom side and side walls where the adhesive is liquid as at 18c (FIG. 4) and thus minimizes oxidation. When all of the adhesive is melted there will, of course, be some oxide scum left and generally this is in the form of a more or less continuous film 22 (FIG. 5), which cannot escape as it cannot pass through the perforations. In the event that the film is discontinuous or broken up its passage through the perforations is opposed by the upstanding flanges 20 which trap it.

The preferred shape, as described, is of rectangular cross-section, however, a frusto-conical shape package may be used as shown in FIGS. 6 and 7, or a hemispherical shape package, as shown in FIGS. 8 and 9.

The features common to all forms of the package are that it consists of a body of thermoplastic adhesive which is solid at normal temperatures, that is, does not flow or creep over long periods of time at temperatures ordinarily experienced in shoe manufacturing processes and pressures normally encountered in shoe making operations, enclosed within a receptacle of thin metal or the like, which has at its bottom part a plurality of small perforations through which the adhesive may be drawn off as it is melted, the perforations in the bottom however serving as a screen to trap and retain the residue of oxide scum formed during melting and deposited at the bottom as the last of the adhesive is used up.

Apparatus for use in melting the adhesive packages, as shown in FIGS. 1 through 5, rapidly and without oxidation is shown in FIGS. 10, 11 and 12. As there shown the apparatus includes a melting pot 24 which is constructed to have a bottom 26 containing holes 27, and upwardly diverging walls 28 corresponding in inclination to the slope of the walls of the package receptacle. The walls 28 are made sufficiently thick to include a resistance coil 30 to heat the inner surface of the pot and are preferably composed of a material which will not store and retain heat. A terminal plug 32 at or near the bottom of the pot 24 provides for attachment of a source of electric current to the resistance coil. Beneath the perforate bottom there is a sealed chamber or housing 34 on which the pot may sit and in the wall of the chamber near the lower part there is a nipple 37 preferably provided with a valve which may be opened to permit periodic delivery of liquid adhesive draining into the chamber to a place of use. To facilitate flow of the melted adhesive from the bottom 14 of the receptacle 10 without having to match the holes 16 in the bottom of the receptacle with the holes 27 in the bottom of the pot, the latter as shown in FIG. 12, has an overall recess 36 part way through it, the perimeter of which is crenelated as at 38 and within which are a plurality of islands 40 and the remainder of which is provided with the holes or passages 27 located within the recess 36 and extending through the bottom of the pot. The bottom of the container when the container is placed in the pot will rest on the crenelations and the island above the bottom of the recess; hence the melted adhesive will first drain through the bottom of the receptacle into the recess and then flow into the holes 27 and from thence through the bottom of the pot into the chamber therebeneath.

The package comprising the receptacle 10 and the block of adhesive 18 is slipped bottom side down into the pot 24. The package and pot are accurately dimensioned to have corresponding cross sections so that the package will slide easily into the pot to a position such as shown in FIG. 10 in which its perforate bottom rests on the crenelations and islands at the bottom of the pot so that it is elevated slightly from the bottom of the pot by the height of the recess. Current is then supplied to the resistance heating coil. The heat supplied to the coil heats the thin metal walls of the receptacle 10 and since the latter are highly heat conductive, the heat spreads rapidly over the entire bottom and side surfaces of the adhesive with the result that a thin film c of adhesive is melted at the interfaces between the adhesive and the inside of the receptacle wall. While the receptacle walls are very thin and hence conduct heat very rapidly to the contiguous surface of the adhesive, the adhesive itself acts as an insulator, hence the rapid heating takes place almost exclusively at the surfaces contacted by the receptacle without penetrating the interior of the block. Substantially no heat is conducted to the top of the package because the receptacle has no wall in contact therewith. Hence the entire core of the block inwardly of the bottom and side surfaces melted by direct contact with the bottom and walls remains solid. The weight of the block of adhesive presses upon the liquid adhesive at the bottom of the container and forces or extrudes it through the perforations 16 in the receptacle into the bottom of the pot and from thence downwardly through the holes 27 in the bottom 26 of the pot into the space 42 therebelow. Discharge of the adhesive through the bottom of the receptacle allows the solid block to settle into the receptacle thereby forcing some of the adhesive at its side surfaces downwardly with the result that the unmelted surface of the block moves into contact with the walls and begins to melt. Melting of the surface creates a new film of adhesive and this as previously described is forced downwardly through the bottom of the receptacle into the pot and from thence into the chamber therebelow. The film of adhesive formed at any one time at the side surfaces of the block is so thin that the crack at the top of the block between it and the walls is very small and hence substantially no air reachest the molten adhesive. Moreover, the block itself forms a plug or seal for the container preventing access of air to the subjacent melted adhesive. The decrease in top to bottom thickness of the block is accompanied by a decrease in transverse thickness without change in the angularity of the slop of the walls. As a result, as the block becomes dimensionally smaller it settles to a position lower down in the receptacle of corresponding dimensions thus constantly maintaining contact between the sloping walls of the block and the sloping walls of the receptacle so that no gap forms between them and hence there is no opportunity for air to enter therebetween. This condition will continue until the final vertical thickness of the block becomes so thin as to be melted by the heat transferred to it from the bottom of the pot. As the block settles an oxidized film is left on the wall of the receptacle which stretches across the crack between the wall and solid adhesive thereby excluding air from the melted adhesive below it. This residual oxidized scum left on the walls and formed at the bottom of the receptacle as the last of the melted adhesive flows through the bottom is of course within the receptacle and hence when the receptacle is removed from the pot the scum is lifted free of the pot hence eliminating the task of cleaning the pot. The receptacle is expendable and may be thrown away.

This application constitutes a continuation-in-part of my application Serial No. 473,169, filed December 6, 1954 for Adhesive Apparatus and Method of Using the Same now abandoned.

It should be understood that the present disclosure is for the purpose of illustration only and that this invention includes all modifications and equivalents which fall within the scope of the appended claims.

I claim:

1. A combined storage package and dispenser for storing thermoplastic adhesive and subsequently dispensing the adhesive comprising: a throw-away thin wall receptacle having a bottom part and upwardly extending side parts bounding the bottom part; a plurality of small perforations in the bottom part; an upstanding flange bounding each perforation; and a solid body of thermoplastic adhesive having substantially no cold flow at ambient temperatures substantially filling the receptacle.

2. A package according to claim 1, wherein the receptacle decreases in cross-section from top to bottom.

3. A package according to claim 1, wherein the receptacle is of rectangular cross-section and decreases in cross-sectional area from top to bottom.

4. An apparatus for discharging melted thermoplastic adhesive onto a workpiece including a melting pot with a bottom; a package substantially filled with thermoplastic adhesive in its solid state supported on said bottom; heating means for melting the solid adhesive; at least one passage in said bottom through which the melted adhesive may flow; a discharge chamber in communication with said passage for collecting the melted adhesive; and valve means for enabling the melted adhesive to be discharged from the discharge chamber onto a workpiece; said package comprising a throw-away thin wall receptacle resting on said melting pot bottom, said receptacle having a bottom part containing a plurality of small perforations; and said solid body of thermoplastic adhesive having substantially no cold flow at ambient temperatures.

5. The apparatus of claim 4 wherein each of said perforations is bounded by an upstanding flange.

6. The apparatus of claim 4 wherein said receptacle has side parts extending upwardly and outwardly from said bottom part.

References Cited in the file of this patent

UNITED STATES PATENTS

| | | |
|---|---|---|
| 117,718 | Arey | Aug. 8, 1871 |
| 1,121,181 | Hall | Dec. 15, 1914 |
| 1,373,275 | Taylor | Mar. 29, 1921 |
| 1,954,251 | Lofgren | Apr. 10, 1934 |
| 2,809,772 | Weisz | Oct. 15, 1957 |

FOREIGN PATENTS

| | | |
|---|---|---|
| 568,442 | Great Britain | June 5, 1944 |
| 1,065,057 | France | Dec. 30, 1953 |